Patented Oct. 25, 1927.

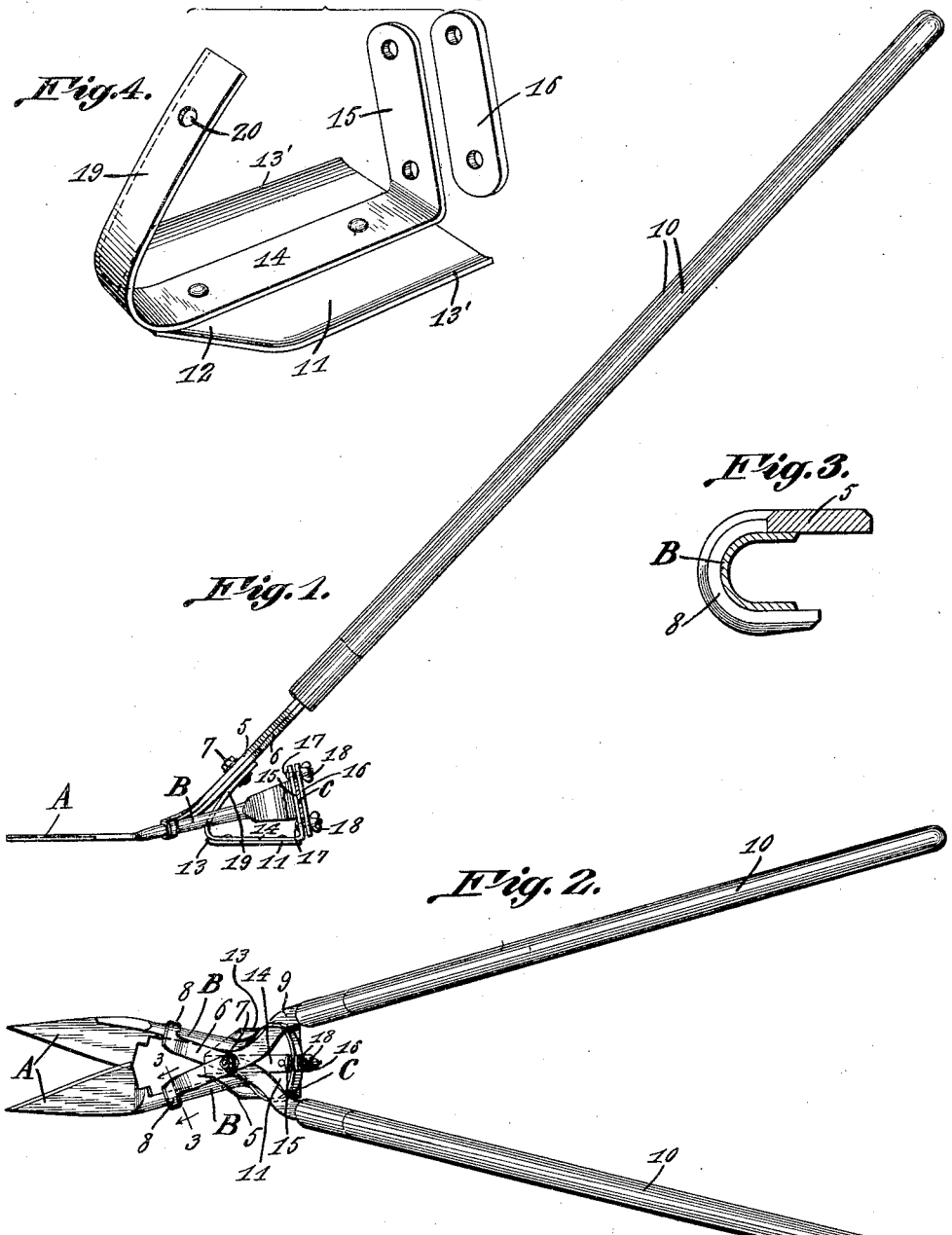

1,647,085

UNITED STATES PATENT OFFICE.

MOSES S. DEARBORN, OF OAKLAND, CALIFORNIA.

GRASS-SHEARS ATTACHMENT.

Application filed August 30, 1926. Serial No. 132,551.

The invention relates to a shears attachment, and more especially to that class of shears known as hand lawn shears or hedge trimmers.

The primary object of the invention is the provision, of an attachment of this character, wherein any ordinary or usual form of hand operated lawn shears can be conveniently engaged therein, so that said lawn shears can be expeditiously operated by a user when in standing position, thereby eliminating such user from assuming an awkward stooping position or kneeling attitude when trimming the lawn, hedge or other shrubbery.

Another object of the invention is the provision of an attachment of this character, wherein the construction thereof is novel in form and constitutes a runner for the lawn shears when engaged by the attachment and will enable such shears to be manually manipulated in an easy and convenient manner while the user or operator is in erect position.

A further object of the invention is the provision of an attachment of this character, wherein the operating handles thereof can be conveniently engaged with the arms of the usual or ordinary lawn shears and such handles clamped thereto, so that on manipulation thereof the shears will be operated, while the user is in a standing or erect position.

A still further object of the invention, is the provision of an attachment of this character, wherein the ordinary or customary lawn shears can be conveniently and easily glided over the ground surface and the shears actuated manually by the user thereof, when standing erect or in kneeling position.

A still further object of the invention is the provision of an attachment of this character, which is extremely simple in construction, readily and easily applied to or removed from the customary or usual lawn shears, thoroughly reliable and efficient in its operation and purpose, strong, durable, and possessing but few parts, thus rendering the same inexpensive to manufacture and install.

With these and other objects in view, the invention consists of the features of construction, combination and arrangement of parts, as will be hereinafter fully described, illustrated in the accompanying drawing and pointed out in the claims hereunto appended.

In the accompanying drawing:—

Figure 1 is a side elevation of an attachment constructed in accordance with this invention, showing the same applied to the lawn shears, the latter being partly broken away, to illustrate in detail the mode of attachment.

Figure 2 is a top plan view of the attachment and the shears in joined relation to each other.

Figure 3 is a sectional view on the line 3—3 of Figure 2, looking in the direction of the arrow.

Figure 4 is a perspective view of the runner and its adjunct parts detached from the attachment for the lawn shears.

Similar reference characters indicate corresponding parts throughout the several views in the drawing.

Referring to the drawing in detail, the usual or customary hand operated lawn shears includes the blades A having extending rearwardly from the outer side edges thereof the well known forwardly inclined handle portions B, which as usual merge into a flat spring loop C, which latter is adapted to normally hold said blades in an open position.

The blades A of the lawn shears as hereinbefore described as being of the usual well known construction are opened and closed to secure a shearing action by the attachment, which comprises a pair of crossed levers 5 and 6, respectively, these being connected together for pivotal action at their point of crossing through the medium of a pivot bolt 7, of any desirable type or form. The levers 5 and 6 at their forward or toe ends have formed thereon laterally disposed, outwardly, downwardly, inwardly bent claws 8, which are adapted to encircle the handle portion B, of the lawn shears, to engage and grip the same, as is clearly shown in Figures 1 and 2 and in Figure 3 in detail, of the drawing.

These levers 5 and 6 at their rear or heel end portions are laterally bent, to provide extensions 9, to which are firmly fastened handles 10, each being of the desired length and proportion, so that the user of the attachment for the lawn shears can operate the latter when in an erect or standing position.

Connected with the pivot 7 of the levers 5 and 6 and the spring loop C of the lawn shears is a runner comprising a shoe plate 11, having the major portion thereof of substantially rectangular form, with the forwardly tapered toe 12 provided with a blunt tip 13, the latter being slightly upwardly curved, while the side edges 13' of this shoe plate are upwardly curved, thereby preventing the same from cutting into the ground when gliding over the same in the use of the attachment for the manual manipulation of the lawn shears.

Secured to the plate 11 centrally thereof and longitudinally disposed is a bracket 14, having at its rear end an upstanding slightly forwardly inclined attaching ear 15 to engage against the inner side of the spring yoke C of the lawn shears. Engaged with this ear 15 is an attaching cleat 16, which is detachably engaged through the medium of bolts 17 passed through the ear and cleat, respectively and carrying the usual winged nut 18. In this manner the rear end of the runner is detachably secured to the shears.

The forward portion of the bracket 14 is bent upwardly and rearwardly to provide a rearwardly inclined extension 19 constituting a hanger provided with a suitable aperture 20 to receive the pivot bolt 7 of the attachment and in this manner the forward end of the runner is engaged with and constitutes a part of the levers 5 and 6 of said attachment. By reason of the disposition of the ear 15 and the extension 19 or hanger the runner constituted by the plate 11 will be disposed horizontally with respect to the blades A of the lawn shears and held in a plane beneath the plane of the lawn shears blades, so that the said lawn shears can be glided over the ground surface, when actuated by the attachment for opening and closing the blades A so that the said lawn shears may be manually manipulated for cutting grass, hedges or other shrubbery, without the necessity of the operator bending or stooping while operating the same.

It is of course understood that by reason of the spring tension from the spring loop of the lawn shears the blades A are normally opened and when the attachment is applied as heretofore described and clearly shown in the drawing, it is only necessary for an operator to press the handles 10 toward each other, which closes the blades A of the lawn shears and when pressure is relieved from the handles 10 the said lawn shears will automatically open under the tension of the loop C thereof. In the use of the attachment, it is only necessary to clamp the same to a pair of ordinary lawn shears in the manner described and shown in the drawing, and then actuate the handles to operate the shears.

From the foregoing description, it will be seen that the lawn shears attachment is of very simple construction and enables the said lawn shears to be operated with dispatch and conveniently and easily glided over the ground surface, as the runner rests thereon.

What is claimed is:—

1. In a lawn shears attachment of the character described comprising a pair of pivotally connected levers, means at the forward ends of the levers for removably embracing the handle portions of the lawn shears, and a runner having its forward end connected with the levers at their pivotal axis and adapted for detachable connection with the lawn shears.

2. In a lawn shears attachment of the character described comprising pivotally connected scissor-like action members, claws on the forward ends of said members for removably receiving the handle portions of lawn shears, a runner having an extension with its forward end connected with the pivot between the members and adapted to be disposed in a plane beneath the plane of the blades of said lawn shears, and means at the rear end of the runner to form a clamp for detachably connecting the same to said lawn shears at its rear end.

3. In a lawn shears attachment of the character described comprising pivotally connected scissor-like action members, claws on the forward ends of said members for removably receiving the handle portions of lawn shears, a relatively broad runner having an extension with its forward end connected with the pivot between the members and adapted to be disposed in a plane beneath the plane of the blades of said lawn shears, means at the rear end of the runner to form a clamp for detachably connecting the same to said lawn shears at its rear end, and relatively long handle portions formed on said members.

4. In a lawn shears attachment of the character described, a relatively broad runner having upwardly converging extensions at opposite ends, pivotally connected scissors-like action members having their pivotal connection engaged in the upper end portion of the forward extension, claws formed on the lower ends of said members to removably receive therein the handle portions of lawn shears, and means carried on the rear extension for detachably clamping said shears thereto for holding the said shears in forwardly extending relation to the runner.

In testimony whereof, I affix my signature hereto.

MOSES S. DEARBORN.